United States Patent
Iannace et al.

(10) Patent No.: US 10,225,731 B2
(45) Date of Patent: Mar. 5, 2019

(54) ANONYMOUSLY LINKING CARDHOLDER INFORMATION WITH COMMUNICATION SERVICE SUBSCRIBER INFORMATION

(71) Applicant: MasterCard International Incorporated, Purchase, NY (US)

(72) Inventors: Marianne Iannace, North Salem, NY (US); David Rich, Ridgefield, CT (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 15/339,106

(22) Filed: Oct. 31, 2016

(65) Prior Publication Data

US 2018/0124596 A1 May 3, 2018

(51) Int. Cl.
*H04L 29/08* (2006.01)
*H04W 12/02* (2009.01)
*H04W 24/08* (2009.01)
*H04W 64/00* (2009.01)

(52) U.S. Cl.
CPC ............ *H04W 12/02* (2013.01); *H04L 67/18* (2013.01); *H04W 24/08* (2013.01); *H04W 64/003* (2013.01)

(58) Field of Classification Search
CPC ... H04W 12/02; H04W 64/003; H04W 24/08; H04L 67/02; H04L 67/306
USPC ........................................................ 455/411
See application file for complete search history.

(56) References Cited

U.S. PATENT DOCUMENTS

| | | | |
|---|---|---|---|
| 6,898,569 B1* | 5/2005 | Bansal | G06Q 10/063116 340/994 |
| 9,813,446 B2* | 11/2017 | Bailey | H04L 63/1466 |
| 2012/0046049 A1* | 2/2012 | Curtis | H04W 4/025 455/456.3 |
| 2012/0209732 A1* | 8/2012 | Jeong | G06Q 20/3224 705/17 |
| 2013/0268357 A1* | 10/2013 | Heath | H04L 63/00 705/14.53 |
| 2013/0298200 A1* | 11/2013 | Cai | G06F 21/6245 726/4 |
| 2014/0249904 A1* | 9/2014 | Nelsen | G06Q 20/351 705/14.23 |
| 2016/0080485 A1* | 3/2016 | Hamedi | H04L 67/02 709/204 |
| 2016/0210605 A1* | 7/2016 | Vaish | G06Q 20/12 |
| 2016/0269923 A1* | 9/2016 | Celik | H04W 24/10 |
| 2017/0034176 A1* | 2/2017 | Qi | H04L 29/08 |
| 2017/0086050 A1* | 3/2017 | Kerning | H04W 4/22 |

* cited by examiner

*Primary Examiner* — Shahriar Behnamian
(74) *Attorney, Agent, or Firm* — Buckley, Maschoff & Talwalkar LLC

(57) ABSTRACT

Provided are a system and method for linking cardholders with communication service subscribers. In one example, a method includes generating anonymized cardholder information representing a group of cardholders that reside within a predetermined geographic location, receiving anonymized communication service subscriber information representing a group of communication service subscribers that reside within the predetermined geographic location, and linking the anonymized cardholder information to the anonymized communication service subscriber information based on the predetermined geographic location.

21 Claims, 5 Drawing Sheets

ANONYMOUSLY LINKING CARDHOLDER INFORMATION WITH COMMUNICATION SERVICE SUBSCRIBER INFORMATION

FIELD

Exemplary embodiments described herein relate generally to generating a linkage between payment card information and communication service information and, more particularly, to generating a many-to-many linkage between a group of payment card users and a group of communication service users based on geo-location information.

BACKGROUND

Personal identification information (PII) refers to any representation of information that permits the identity of an individual to whom the information applies to be reasonably inferred by either directly or indirectly. For example, PII may include information that directly identifies an individual such as a name, an address, a social security number or other identifying number or code, a telephone number, an email address, a credit card number, a debit card number, and the like. PII may also include information used to identify specific individuals in conjunction with other data elements, i.e., indirect identification. For example, these data elements may include a combination of gender, race, birth date, geographic indicator, and other descriptors. Additionally, information permitting the physical or online contacting of a specific individual is the same as personally identifiable information. This information can be maintained in either paper, electronic or other media.

Just about every entity such as companies, organizations, and the like, acquires, uses, and stores personally identifiable information in some fashion. Most have it for their own employees and agents, and depending on their area of business, may also have it for a wider group including customers, patients, residents, students, and the like. The loss of PII can result in substantial harm to individuals, including identity theft or other fraudulent use of the information. Misusing, losing or otherwise compromising this data can carry a steep financial cost and damage an organization's reputation. Therefore, the entities must keep their PII secure. Furthermore, entities are not allowed to share personal identity information.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The exemplary embodiments described herein relate to linking together payment card information and communication service subscriber information. Rather than use personally identifiable information, the exemplary embodiments use anonymized data to infer a location of a group of cardholders and to infer a location of a group of communication service subscribers and link the two groups together based on a common inferred location. In cases where there is a concern that one to one linkage that may result in the disclosure of personal data, you can use a many to many mapping between the payment card information and communication service subscriber information. The many to many mapping will ensure that minimum population sizes are met in those groups to protect the privacy of the individual members in those groups. The inferred location may be a place of residence, a place at which a user spends a predetermined amount of time, and the like. Using the inferred location, the group of cardholders and the group of communication service subscribers may be linked together without divulging the personal identity of either the cardholders or the mobile phone users. For example, a payment network device such as a card scheme server, a bank, a payment processor, a third party processor, and the like, may infer the location of a cardholder based on anonymized transaction information. A communication service device such as a mobile phone operator, an aggregator, a cable services provider, a satellite television provider, and the like, may infer a location of a service subscriber based on anonymized service usage information, cell tower information, satellite information, and the like. By linking the group of cardholders and the group of communication service subscribers anonymously, the payment network device and the communication service device may share information with each other about transaction data and communication service data without divulging personal identifiable information about their customers.

In the examples herein, the communication service subscriber may be referred to as a mobile phone service subscriber or a mobile phone user. But it should be appreciated that other communication service subscribers may be linked with cardholders. For example, television service subscribers, internet service subscribers, satellite service subscribers, and the like.

Figure 1:
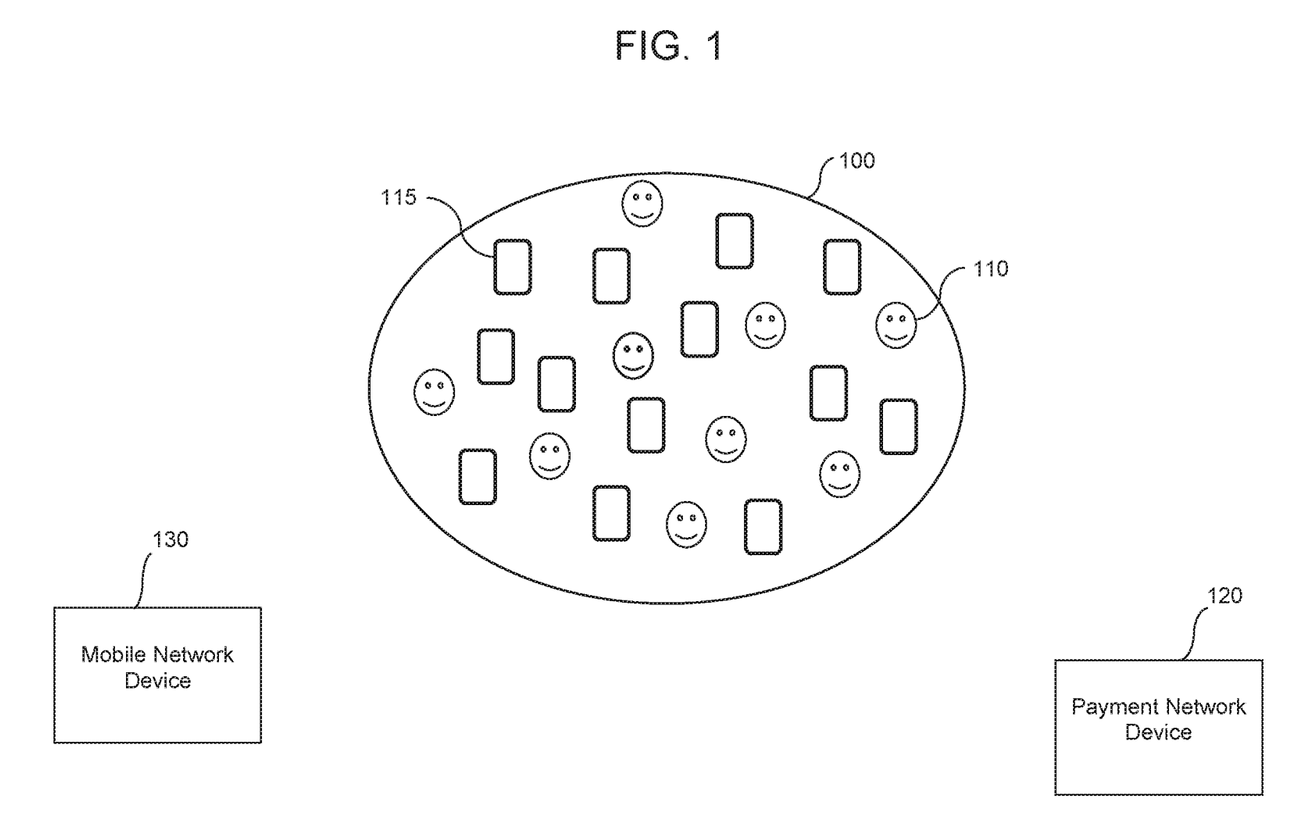
FIG. 1 is a diagram illustrating a system for linking cardholders and mobile phone users in accordance with an exemplary embodiment.

FIG. 1 illustrates a system for linking cardholders and mobile phone users in accordance with an exemplary embodiment. Referring to FIG. 1, a plurality of cardholders 110 and a plurality of mobile users 115 are located within a geographic location 100. The plurality of cardholders 110 may make purchases of items (e.g., goods and/or services) or otherwise transact using one or more payment cards. Payment information and other data about those purchases may be transmitted to payment network device 120. The plurality of mobile phone users 115 having corresponding mobile devices may perform communication such as transmit and receive calls, texts, emails, interact via a network such as the Internet, and the like, and information about the communication may be monitored by or received at mobile network device 130. According to various aspects, a geographic location at which the cardholders 110 and the mobile users 115 are located (e.g., reside) may be determined, inferred, estimated, or the like, by the payment network device 120 and the mobile network device 130, respectively. For example, the payment network device 120 may determine where a cardholder 110 resides based on transaction data by one or more payment cards that are owned by the cardholder 110. The mobile network device 130 may determine where a mobile user resides based on mobile device data from one or more mobile devices that are owned by the mobile user 115.

For example, each cardholder 110 may be a holder of one or more payment cards such as a credit card, a debit card, a deposit account, a loyalty card, a rewards card, and the like. Transaction information about purchases made by the cardholder 110 using a payment card may be received by the payment network device 120. The payment network device 120 may be a card scheme server such as MasterCard, Visa, American Express, and the like. As another example, the payment network device 120 may be a payment processor, a gateway server, a bank, and the like. Furthermore, the mobile users 115 may correspond to mobile devices such as mobile phones, tablets, phablets, notebook computers, smart wearable devices, and the like. Mobile device information generated from the mobile device of a mobile user 115 may be received by the mobile network device 130. The mobile network device 130 may be a mobile phone operator (MPO), a third party aggregator, and the like, which receives mobile phone usage data of the mobile users 115. The examples herein are not limited to a particular payment network device or communication service network device, and it is not required that these devices be included in a payment network or communication service network. Instead, these terms are used for purposes of convenience. Also, in FIG. 1 the payment network device 120 and the mobile network device 130 are shown separately. However, a single entity or device may be used to generate both the anonymized cardholder information and the anonymized mobile device user information such as a device receiving cardholder transaction information and mobile device usage information.

According to various examples, the cardholders 110 and the mobile users 115 may be linked to each other using a probabilistic matching method based on anonymized cardholder payment information and anonymized mobile device information. Instead of using PII, the cardholders 110 and the mobile users 115 may remain anonymous and may be linked to one another in a many-to-many link, for example, based on a geographic location (e.g., a geo-fence). Based on spending behavior of a payment card corresponding to a cardholder 110, the payment network device 120 may infer where the cardholder 110 resides. The spending behavior or transaction behavior may occur within the predetermined geographic location 100 or outside of the predetermined geographic location 100. As a non-limiting example, the payment network device 120 may infer where a cardholder resides from residential zip code models using the transaction data generated using one or more payment cards, other statistical models, and the like. The payment network device 120 may anonymize cardholder information for a group of cardholders 110. The anonymized cardholder information may include spending habits of the group of cardholders, the number of cardholders, and the like, within the geographic region 100. Here, the anonymized cardholder information may not provide personal identifiable information about any cardholder 110. Accordingly, transaction data of each of a plurality of cardholders 110 such as those shown in the geographic location 100 of FIG. 1 may be combined with one another and may be used to anonymously represent the group of cardholders 110.

According to various aspects, based on mobile device data of a mobile user 115, the mobile network device 130 may infer where the mobile user 115 resides or is otherwise located. As a non-limiting example, the mobile network device 130 may infer where the mobile user 115 resides based on where the mobile device is located during the night, in other words, where the mobile user 115 of the mobile device sleeps. The mobile network device 130 may anonymize mobile device data for a group of mobile users 115. The anonymized mobile phone information may include a number of mobile users in the geographic location 100, a latitude and longitude of a location of the mobile device, an amount of mobile devices corresponding to each mobile user 115, cell tower information, and the like. Here, the anonymized mobile user information may not provide personal identifiable information about any mobile user 115. Accordingly, mobile device data of a plurality of mobile users 115 such as those shown in the geographic location 100 of FIG. 1 may be combined with one another and may be used to anonymously represent a group of mobile users 115 without divulging their personal identity.

As a result, anonymized payment card information of the group of cardholders 110 within the geographic region 100 may be associated with or linked to mobile device information of the group of mobile users 115 within the geographic region 100 in a probabilistic fashion. For example, the group of cardholders 110 that are inferred to reside within geographic location 100 may be linked to the group of mobile users 115 that are also inferred to reside within the geographic location 100. Furthermore, modeling on the propensity of the group of cardholders 110 to purchase things in the future may be performed based on payment card spending information. Accordingly, various advertisements, coupons, and the like, may be provided to the mobile devices of the group of mobile users 115 linked to the payment cards of the group of cardholders 110 based on the modeled propensity to purchase. In these examples, the linkage may occur based on the geographic location 100. The geographic location 100 may be flexible and customizable. For example, the geographic location 100 may be a post code, a zip code, a zip code +4 digits, designated market area (DMA), and the like.

By linking together the group of cardholders 110 and the group of mobile users 115 by location, the payment network device 120 may share information with the mobile network device 130, and vice versa, through a common linkage without divulging personal identifiable information about consumers and/or mobile phone users. Furthermore, by refining the matching to a particular geographic location 100 such as a zip code +4, and the like, the matching may be fairly accurate to within a city block or an even smaller geographic location as long as there are at least two cardholders 110 and two mobile users 115 such that none of the cardholders 110 and/or the mobile users 115 can be identified.

Figure 2:
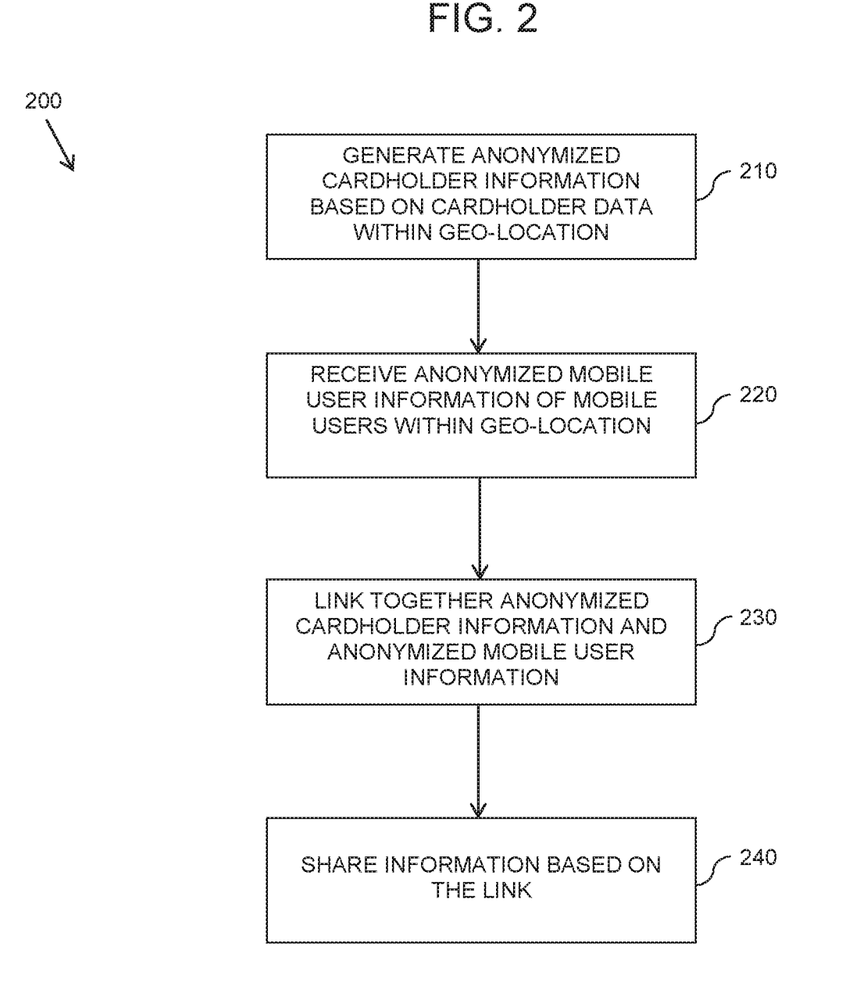
FIG. 2 is a diagram illustrating a method for linking cardholders and mobile phone users in accordance with an exemplary embodiment.

FIG. 2 illustrates a method 200 for linking cardholders and mobile phone users in accordance with an exemplary embodiment. As a non-limiting example, the method 200 may be performed by the payment network device 120 shown in FIG. 1. Referring to FIG. 2, the method 200 includes generating anonymized cardholder information for a group of cardholders within a geographic location in 210. For example, the anonymized cardholder information may be generated based on non-identifying transaction information such as purchase information, dates, merchant information, times, and the like. The anonymized cardholder information may be generated differently or the same for each cardholder from among a plurality of cardholders that reside within a predetermined geographic region. The generated anonymized cardholder information may be used to represent the group of cardholders that reside within a predetermined geographic location. For example, the anonymized cardholder information such as past spending behavior and/or future forecasted spending behavior may be modeled, normalized, averaged, and the like, among the plurality of cardholders within the group. Also, the anonymized cardholder information may represent an inferred residential location of the group of cardholders.

The method 200 further includes receiving anonymized mobile device user information representing a group of mobile device users within the predetermined geographic location, in 220. The anonymized mobile device user information may be based on mobile device usage, location, dates, times, and the like, performed by mobile devices of the group of mobile device users. For example, the anonymized mobile device user information may be generated by a mobile phone operator, a mobile data aggregator, and the like. The anonymized mobile device user information may be received from a mobile phone network device and may be generated based on non-identifying mobile device usage by the group of mobile device users within the predetermined geographic location. The anonymized mobile device user information may include an inferred residential location of the group of mobile device users. Also, the anonymized mobile device user information may include an amount of mobile devices owned by each user, a number of mobile device users within the predetermined geographic location, cell tower information corresponding to the mobile devices, and the like.

In 230, the anonymized cardholder information is linked to the anonymized mobile device user information based on the predetermined geographic location. Here, the linking may be performed based on the predetermined geographic region which may include a specific location. As another example, the predetermined geographic region may be a customizable geographic location that is malleable. The predetermined geographic region may be set by the payment network device, the mobile network device, a third party, and the like. By linking the anonymized cardholder information to the anonymized mobile device user information, in 240 the method further includes sharing information based on the linkage. For example, anonymous transaction data may be shared between a financial entity and a mobile phone entity or other communication services entity. As another example, the linking in 230 may include linking the anonymized group of mobile device users with the non-identifying anonymized transaction information about the plurality of cardholders based on the predetermined geographic location. As a result of the link, for example, advertisements may be transmitted to mobile device users based on the anonymized cardholder information of the group of cardholders linked to the group of mobile device users. As another example, anonymous mobile phone usage, location data, other mobile device data, and the like, of a mobile device user, may be shared between the mobile network entity and the financial entity. As a result, the amount of information of value used for determining customer interests and better serving customers may be expanded to include more data.

Figure 3:
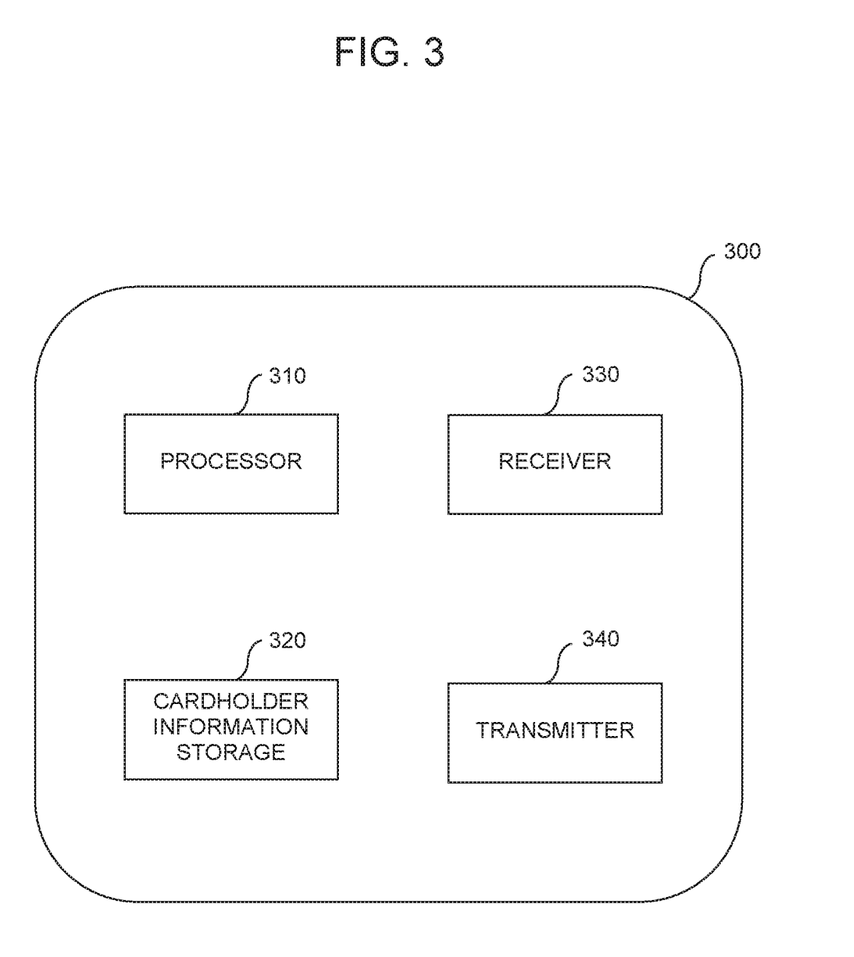
FIG. 3 is a diagram illustrating a payment network device in accordance with an exemplary embodiment.

FIG. 3 illustrates a payment network device 300 in accordance with an exemplary embodiment. For example, the payment network device 300 may be the payment network device 120 shown in FIG. 1 and capable of performing the method 200 shown in FIG. 2. Referring to FIG. 3, the payment network device 300 includes a processor 310, cardholder information storage 320, a receiver 330, and a transmitter 340. The transmitter 340 and the receiver 330 may transmit and receive data, for example, through a wired or wireless connection. The transmitter 340 and the receiver 330 may correspond to a network interface capable of transmitting and receiving data over a network such as the Internet, a radio interface capable of transmitting and receiving data through radio signals, and the like. Also, it should be appreciated that the payment network device 300 may include additional components not shown in FIG. 3, or may not include all of the components shown in FIG. 3. The payment network device 300 may be a card scheme server, a payment processor, a third party, and the like.

The payment network device 300 may generate anonymized cardholder information about a group of cardholders residing or otherwise located within a predetermined geographic region. The receiver 330 may receive transaction information of a plurality of cardholders who transact using various payment cards. In this example, the processor 310 may anonymize the data by combining transaction information for a group of cardholders and anonymizing the transaction information such that values represent non-identifying values, such as an average value, a normalized value, and the like, for the group of cardholders as a whole instead of individually. As an example, the anonymized cardholder information may include a statistic that indicates that 20% of the cardholders within a predetermined geographic location prefer fast food over fine dining. As another non-limiting example, the anonymized cardholder information may indicate that 40% of the cardholder within a predetermined geographic location purchase flowers on Mother's Day. It should be appreciated that the examples are not limited thereto, and any other non-identifying cardholder information may be generated. After generating the non-identifying anonymized cardholder information, the anonymized cardholder information may be stored in the cardholder information storage 320.

The receiver 330 may receive anonymized mobile device user information representing a group of mobile device users that also reside within the predetermined geographic location. The anonymized mobile device user information may be generated by and received from a mobile network device and may be based on mobile device usage, location, dates, times, and the like. For example, the anonymized mobile device user information may be generated by a mobile phone operator, a mobile data aggregator, and the like. The anonymized mobile device user information may include an inferred residential location of the group of mobile device users. Also, the anonymized mobile device user information may include an amount of mobile devices owned by each user, a number of mobile device users within the predetermined geographic location, cell tower information corresponding to the mobile devices, and the like.

The processor 310 may link together the anonymized cardholder information generated by the processor 310 and the anonymized mobile device user information received by the receiver 330, based on the predetermined geographic location. For example, the linking may be based on a postal code, a zip code, and a zip code +4, and the like. By linking the anonymized cardholder information to the anonymized mobile device user information, the payment network device 300 may share (e.g., transmit and/or receive) anonymized cardholder information with a mobile network device, and the like. For example, anonymous transaction data may be transmitted between a financial entity and a mobile phone entity. Accordingly, advertisements may be transmitted by the transmitter 340 to mobile device users based on the anonymized cardholder information of the group of cardholders linked to the group of mobile device users. As another example, anonymous mobile phone usage, location data, other mobile device data, and the like, of a mobile device user, may be shared between the mobile network entity and the financial entity. As a result, the amount of information of value used for determining customer interests and better serving customers may be expanded to include more data.

Figure 4:
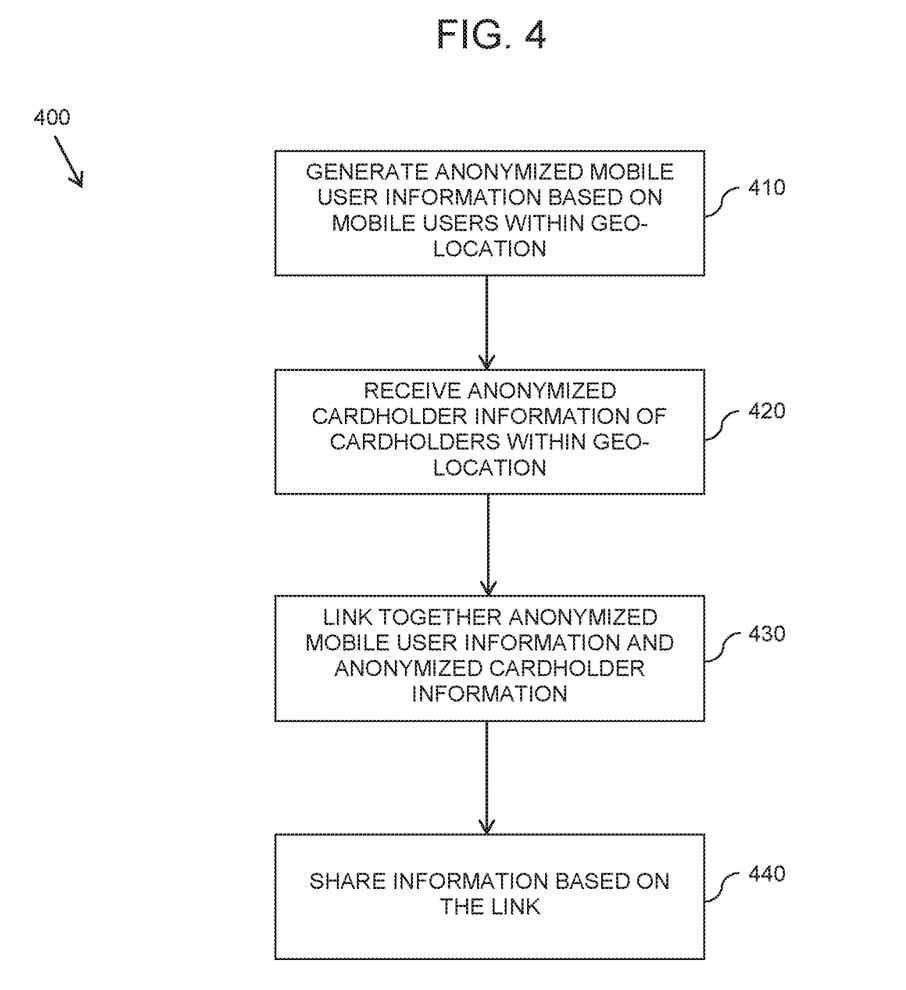
FIG. 4 is a diagram illustrating a method for linking cardholders and mobile phone users in accordance with another exemplary embodiment.

FIG. 4 illustrates a method 400 for linking cardholders and mobile phone users in accordance with another exemplary embodiment. For example, the method 400 may be performed by the mobile network device 130 shown in FIG. 1. Referring to FIG. 4, the method 400 includes generating anonymized mobile device user information representing a group of mobile device users that reside within the predetermined geographic location in 410. The anonymized mobile device user information may be generated based on based on mobile device usage, location, dates, times, and the like, performed by mobile devices of the group of mobile device users. The anonymized mobile device user information may include an amount of mobile devices owned by each user, a number of mobile device users within the predetermined geographic location, cell tower information corresponding to the mobile devices, and the like. Also, the anonymized mobile device user information may be used to represent an inferred residential location of the group of mobile device users. The anonymized mobile device user information may be generated differently or the same for each mobile device user from among a plurality of mobile device user that reside within a predetermined geographic region. The generated anonymized mobile device user information may be used to represent the group of mobile device users that reside within a predetermined geographic location.

The method 400 further includes receiving anonymized cardholder information representing a group of cardholders that also reside within the predetermined geographic location in 420. The anonymized cardholder information may be received from a payment network device and may be generated based on non-identifying transaction data of the group of cardholders within the predetermined geographic location. Here the transaction data may occur within the predetermined geographic location or outside of the predetermined geographic location. The anonymized cardholder information may include an inferred residential location of the group of cardholders. Also, the anonymized cardholder information may include anonymized spending habits of cardholders, a number of payment cards associated with each cardholder, location of transaction, date of transaction, time of transaction, merchant information, and the like.

In 430, the anonymized mobile device user information is linked to the anonymized cardholder information based on the predetermined geographic location. In cases where there is a concern that one to one mapping may result in the disclosure of personal data, you can use many to many mapping between the service provider and the payment network device. For example, the linking may be performed based on the predetermined geographic region which may include, for example, at least one of a postal code, a zip code, and a zip code +4. As another example, the predetermined geographic region may be a customizable geographic location that is malleable. The predetermined geographic region may be set by the payment network device, the mobile network device, a third party, and the like. By linking the anonymized cardholder information to the anonymized mobile device user information, in 440 the method further includes sharing information based on the linkage. For example, anonymous transaction data may be shared between a financial entity and a mobile phone entity. Accordingly, advertisements may be transmitted to mobile device users based on the anonymized cardholder information of the group of cardholders linked to the group of mobile device users. As another example, anonymous mobile phone usage, location data, other mobile device data, and the like, of a mobile device user, may be shared between the mobile network entity and the financial entity. As a result, the amount of information of value used for determining customer interests and better serving customers may be expanded to include more data.

Figure 5:
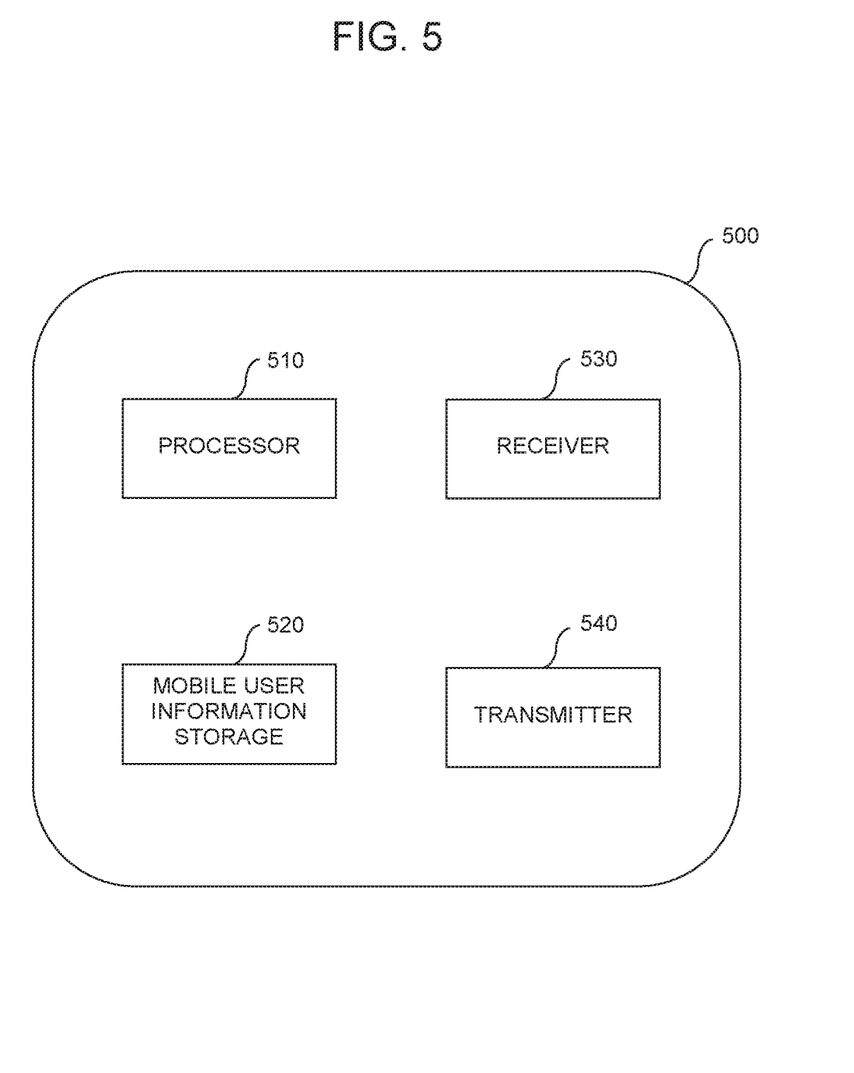
FIG. 5 is a diagram illustrating a mobile phone network device in accordance with an exemplary embodiment.

FIG. 5 illustrates a mobile phone network device 500 in accordance with an exemplary embodiment. For example, the mobile phone network device 500 may be the mobile network device 130 shown in FIG. 1 and capable of performing the method 400 shown in FIG. 4. Referring to FIG. 5, the mobile network device 500 includes a processor 510, mobile user information storage 520, a receiver 530, and a transmitter 540. The transmitter 540 and the receiver 530 may transmit and receive data, for example, through a wired or wireless connection. The transmitter 540 and the receiver 530 may correspond to a network interface capable of transmitting and receiving data over a network such as the Internet, a radio interface capable of transmitting and receiving data through radio signals, and the like. Also, it should be appreciated that the mobile network device 500 may include additional components not shown in FIG. 5, or may not include all of the components shown in FIG. 5. The mobile network device 500 may be a card scheme server, a payment processor, a third party, and the like.

The mobile network device 500 may generate anonymized mobile user information about a group of mobile users residing or otherwise located within a predetermined geographic region. For example, the receiver 530 may receive mobile device information about a plurality of mobile device users who reside within the predetermined geographic location. In this example, the processor 510 may anonymize the data by combining mobile device information for a group of mobile device users and anonymizing the mobile device information such that values represent non-identifying values, such as an average value, a normalized value, and the like, for the group of mobile device users as a whole instead of individually. As an example, the anonymized mobile device user information may include a statistic that indicates that 155 mobile device users reside within the predetermined geographic location, 33 of the mobile device users carry more than one mobile device, and the like. It should be appreciated that the examples are not limited thereto, and any other non-identifying mobile device user information may be generated. After generating the anonymized mobile device user information, the anonymized mobile device user information may be stored in the mobile user information storage 520.

The receiver 530 may receive anonymized cardholder information representing a group of mobile device users that also reside within the predetermined geographic location. The anonymized cardholder information may be generated by and received from a payment network device and may be based on or include payment card transaction information, location, dates, times, and the like. In some examples, the anonymized cardholder information may include an inferred residential location of the group of cardholders, spending behavior, transaction information, and the like. The processor 510 may link together the anonymized mobile device user information generated by the processor 510 and the anonymized cardholder information received by the receiver 530, based on the predetermined geographic location. By linking the anonymized cardholder information to the anonymized mobile device user information, the mobile network device 500 may share anonymized mobile device user information with a payment network device, and the like. Accordingly, advertisements may be transmitted to mobile device users based on the anonymized cardholder information of the group of cardholders linked to the group of mobile device users. As another example, anonymous mobile phone usage, location data, other mobile device data, and the like, of a mobile device user, may be shared between the mobile network entity and the financial entity.

According to various exemplary embodiments, described herein are methods and devices for linking anonymized cardholder information and anonymized mobile device information based on a predetermined geographic location. By anonymous linking cardholder information and mobile device information, cardholder behavior may be linked with mobile device behavior, and the like. Accordingly, information about customers may be obtained without divulging their personal identity and entities may provide enhanced services and opportunities to their customers based on the expanded knowledge.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like, and also refer to any suitable payment account such as a deposit account, bank account, credit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As used herein and in the appended claims, the term "payment card account" includes a credit card account, a deposit account that the account holder may access using a debit card, a prepaid card account, or any other type of account from which payment transactions may be consummated. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   anonymizing cardholder information for a group of cardholders that are located within a predetermined geographic location by removing personally identifiable information (PII) of the group of cardholders from cardholder spending activity data within the predetermined geographic location to generate an anonymized cardholder activity data set;

receiving an anonymized communication service subscriber data set for a group of communication service subscriber devices within the predetermined geographic location in which personally identifiable information of communication service subscriber devices is removed from service activity data;

anonymously linking the group of cardholders as a whole to the group of communication service subscriber devices as a whole without use of personally identifiable information by mapping the anonymized cardholder activity data set to the anonymized communication service subscriber data set based on the predetermined geographic location being commonly shared among the groups; and storing the anonymized cardholder activity data set and the anonymized communication service subscriber data set linked together in a storage device.

2. The method of claim 1, further comprising transmitting advertisement information to one or more communication service subscriber devices of the group of communication service subscriber devices based on the linked anonymized cardholder activity data set.

3. The method of claim 1, wherein the anonymized cardholder activity data set is generated based on non-identifying transaction data of the group of cardholders within the predetermined geographic location.

4. The method of claim 1, wherein the anonymized communication service subscriber data set is received from a mobile phone network device and is generated based on non-identifying mobile device usage within the predetermined geographic location.

5. The method of claim 1, wherein the predetermined geographic location comprises at least one of a postal code, a zip code, and a zip code +4.

6. The method of claim 1, wherein the predetermined geographic location comprises a customizable geographic location.

7. The method of claim 1, wherein the anonymized cardholder activity data set comprises an inferred residential location of the group of cardholders and the anonymized communication service subscriber data set comprises an inferred residential location of the group of communication service subscriber devices.

8. The method of claim 1, further comprising determining an anonymous spending behavior for the group of cardholders based on anonymous transaction data within the predetermined geographic location, and linking the anonymous spending behavior to the group of communication subscriber devices based on the anonymous linking the group of cardholders as a whole to the group of communication service subscriber devices as a whole.

9. A method for linking communication service subscribers and cardholders, the method comprising:

anonymizing communication service subscriber device information for a group of communication service subscriber devices that are located within a predetermined geographic location by removing personally identifiable information (PII) of the group of communication service subscriber devices from service activity data within the predetermined geographic location to generate an anonymized communication service subscriber data set;

receiving an anonymized cardholder data set for a group of cardholders within the predetermined geographic location in which personally identifiable information of the cardholders is removed from cardholder spending activity data; and anonymously linking the group of communication service subscriber devices as a whole to the group of cardholders as a whole without use of personally identifiable information by mapping the anonymized communication service subscriber data set to the anonymized cardholder activity data set based on the predetermined geographic location being commonly shared among the groups; and storing the anonymized communication service subscriber data set and the anonymized cardholder activity data set linked together in a storage device.

10. The method of claim 9, further comprising transmitting advertisement information to one or more communication service subscriber devices of the group of communication service subscriber devices based on the linked anonymized cardholder activity data set.

11. The method of claim 9, wherein the anonymized cardholder activity data set is received from a payment network device and is generated based on non-identifying transaction data generated within the predetermined geographic location.

12. The method of claim 9, wherein the anonymized communication service subscriber data set is generated based on non-identifying mobile device usage within the predetermined geographic location.

13. The method of claim 9, wherein the predetermined geographic location comprises at least one of a postal code, a zip code, and a zip code +4.

14. The method of claim 9, wherein the predetermined geographic location comprises a customizable geographic location.

15. The method of claim 9, wherein the anonymized cardholder activity data set comprises an inferred residential location of the group of cardholders by a payment processing network device and the anonymized communication service subscriber data set comprises an inferred residential location of the group of communication service subscriber devices by a communication service server.

16. A computing device comprising:

a receiver configured to receive an anonymized communication service subscriber data set for a group of communication service subscriber devices that are located within a predetermined geographic location;

a processor configured to anonymize cardholder information for a group of cardholders that are located within the predetermined geographic location by removing personally identifiable information (PII) of the group of cardholders from cardholder spending activity data within the predetermined geographic location to generate an anonymized cardholder activity data set, and anonymously link the group of cardholders as a whole to the group of communication service subscriber devices as a whole without use of personally identifiable information by mapping the anonymized cardholder activity data set to the anonymized communication service subscriber data set based on the predetermined geographic location being commonly shared among the groups; and a storage configured to store the anonymized cardholder activity data set and the anonymized communication service subscriber data set linked together by the processor.

17. A method for linking communication service subscribers and cardholders, the method comprising:

generating non-identifying spending behavior information about a group of cardholders that are located within a predetermined geographic location by removing personally identifiable information (PII) from cardholder spending activity within the predetermined geographic location to generate an non-identifying cardholder spending behavior data set;

receiving an anonymized communication service subscriber data set for a group of communication service subscriber devices that are located within the predetermined geographic location in which personally identifiable information of the communication service subscriber devices is removed from service activity data; and anonymously linking the group of communication service subscriber devices as a whole to the group of cardholders as a whole without use of personally identifiable information by mapping the anonymized communication service subscriber data set to the non-identifying cardholder spending behavior data set based on the predetermined geographic location being shared among the groups.

18. The method of claim 17, further comprising transmitting advertisement information to one or more communication service subscriber devices of the group of communication service subscriber devices based on the linked non-identifying spending behavior data set.

19. The method of claim 17, wherein the anonymized communication service subscriber data set is received from a mobile phone network device and is generated based on non-identifying mobile device usage within the predetermined geographic location.

20. The method of claim 17, wherein the predetermined geographic location comprises at least one of a postal code, a zip code, and a zip code +4.

21. The method of claim 17, wherein the predetermined geographic location comprises a customizable geographic location.

* * * * *